United States Patent
Stubbeman

3,813,926
June 4, 1974

[54] ULTRASONIC PULSED ENERGY INSPECTION SYSTEM

[76] Inventor: Alfred W. Stubbeman, 3909A Westridge Ave., Fort Worth, Tex. 76116

[22] Filed: Feb. 9, 1972

[21] Appl. No.: 224,791

[52] U.S. Cl. .................................. 73/67.7, 73/67.9
[51] Int. Cl. ........................................... G01n 29/04
[58] Field of Search .................................................
    73/67.5 R–67.9; 340/261

[56] References Cited
UNITED STATES PATENTS

| | | | |
|---|---|---|---|
| 3,009,353 | 11/1961 | Erdman | 73/67.9 |
| 3,195,034 | 7/1965 | Bensema | 340/261 X |
| 3,201,776 | 8/1965 | Morrow et al. | 340/261 |
| 3,336,794 | 8/1967 | Wysoczanski et al. | 73/67.5 R |
| 3,575,042 | 4/1971 | Lovelace | 73/67.8 |

*Primary Examiner*—Richard C. Queisser
*Assistant Examiner*—John P. Beauchamp
*Attorney, Agent, or Firm*—Wofford, Felsman & Fails

[57] ABSTRACT

The specification discloses a system to be used with a pulsed acoustic transducer system for inspecting the bonds of bonded structure and comprises a summation circuit for producing an output representative of the algebraic sum of the received signals and a display system for visually displaying the output of the summation circuit. In addition there are provided a low limit gate and a high limit gate coupled to the output of the summation circuit for actuating an alarm system when the output of the summation circuitry falls below or rises above a preselected range to notify the operator of various conditions of a bond or bonds. The low limit gate and alarm also will warn the operator if there is a loss of couplant between the transducer and structure under evaluation or if the transducer is tipped.

21 Claims, 5 Drawing Figures

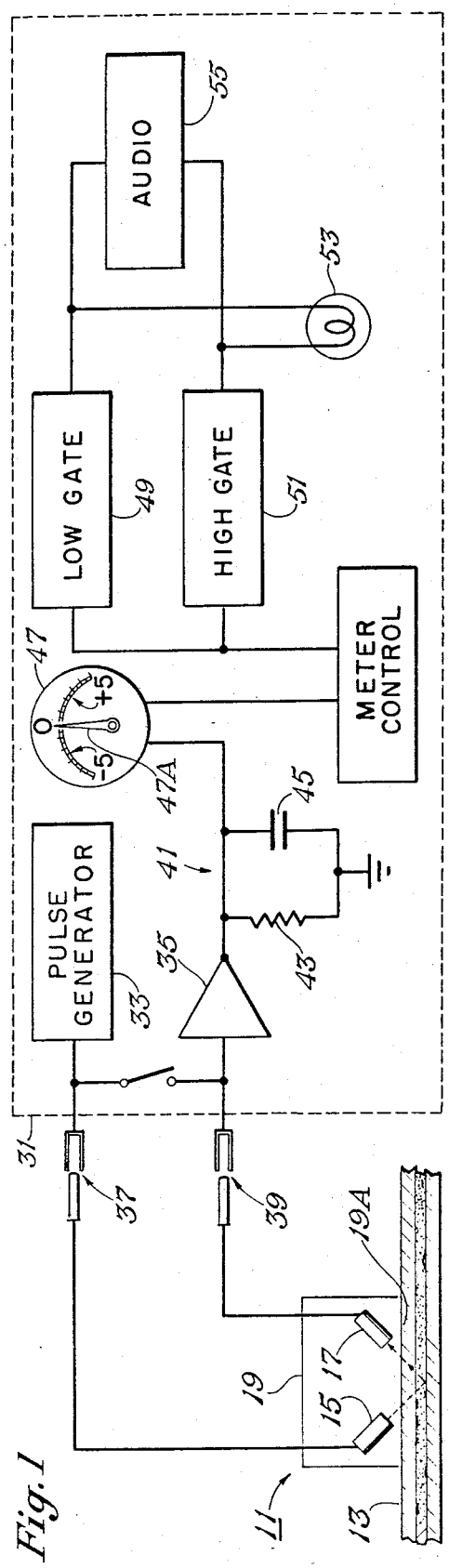
Fig.1
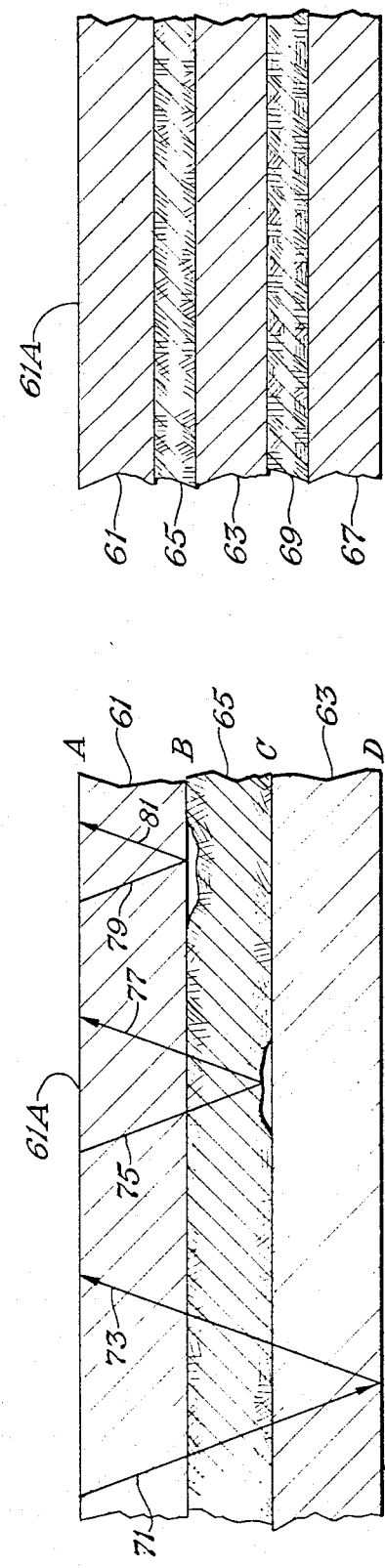
Fig.2
Fig.3

ULTRASONIC PULSED ENERGY INSPECTION SYSTEM

BACKGROUND OF THE INVENTION

This invention relates to an ultrasonic inspection system and more particularly to a system for use with a transducer system for detecting acceptable bonds in a bonded structure.

Ultrasonic testing systems generally employed for testing bonds in a laminated or bonded structure heretofore have been resonant systems that measure the resonant response of a piezo-electric crystal to the structure being tested. While these systems have proved to be useful, they have certain disadvantages. For example they require inspection to be carried out from the thin side of the structure. Moreover, they are not fail safe and cannot determine the depth of a flaw or void or at which interface of a bond line a flaw exists.

SUMMARY OF THE PRESENT INVENTION

In accordance with the present invention, there is provided a unique ultrasonic inspection system that will warn the operator of improper use of the transducer system and which may be employed to inspect a bonded structure from either its thin or thick side. In addition, it can determine at which interface of a bond line a flaw exists and can also locate a flaw which may exist in different levels of bond lines.

The system comprises pulsing means for periodically generating trigger pulses for application to a transducer means or system for actuating the transducer means to periodically generate acoustic pulses for inspection purposes. Amplifier means is employed for amplifying received signals detected by the transducer means following each acoustic pulse. In addition a summation means is coupled to the output of the amplifier means for producing an output representative of the algebraic sum of the received signals detected.

In one aspect, a display means is coupled to the summation means for visually displaying the output thereof.

In another aspect, indicating means is coupled to the output of the summation means for producing an output indication if the output of the summation means is below or above a preselected range. In the embodiment disclosed, the indicating means comprises circuitry for producing first and second signals if the output of the summation means is below or above predetermined low and high values respectively. An alarm system is adapted to be coupled to the circuitry for producing an alarm in response to the first and second signals.

In a further aspect, the circuitry for producing the first and second signals comprises low and high level gate means coupled to the output of the summation means. If the output of the summation means falls between the low and high values defining the range, the alarm system is maintained inactive. If however the output falls below this range, the low gate means will actuate the alarm to notify the operator either that the system is being operated improperly or that an unacceptable bond exists. If the output of the summation means rises above this range, the high gate means will actuate the alarm to notify the operator that an unacceptable bond exists.

BRIEF DESCRIPTION OF THE DRAWINGS

FIG. 1 illustrates in block diagram the apparatus of the present invention;

FIG. 2 illustrates reflection of energy at various interfaces of a bonded structure;

FIG. 3 illustrates a bonded structure having at least three layers of material bonded together.

DETAIL DESCRIPTION OF THE PREFERRED EMBODIMENT

Figure 4:
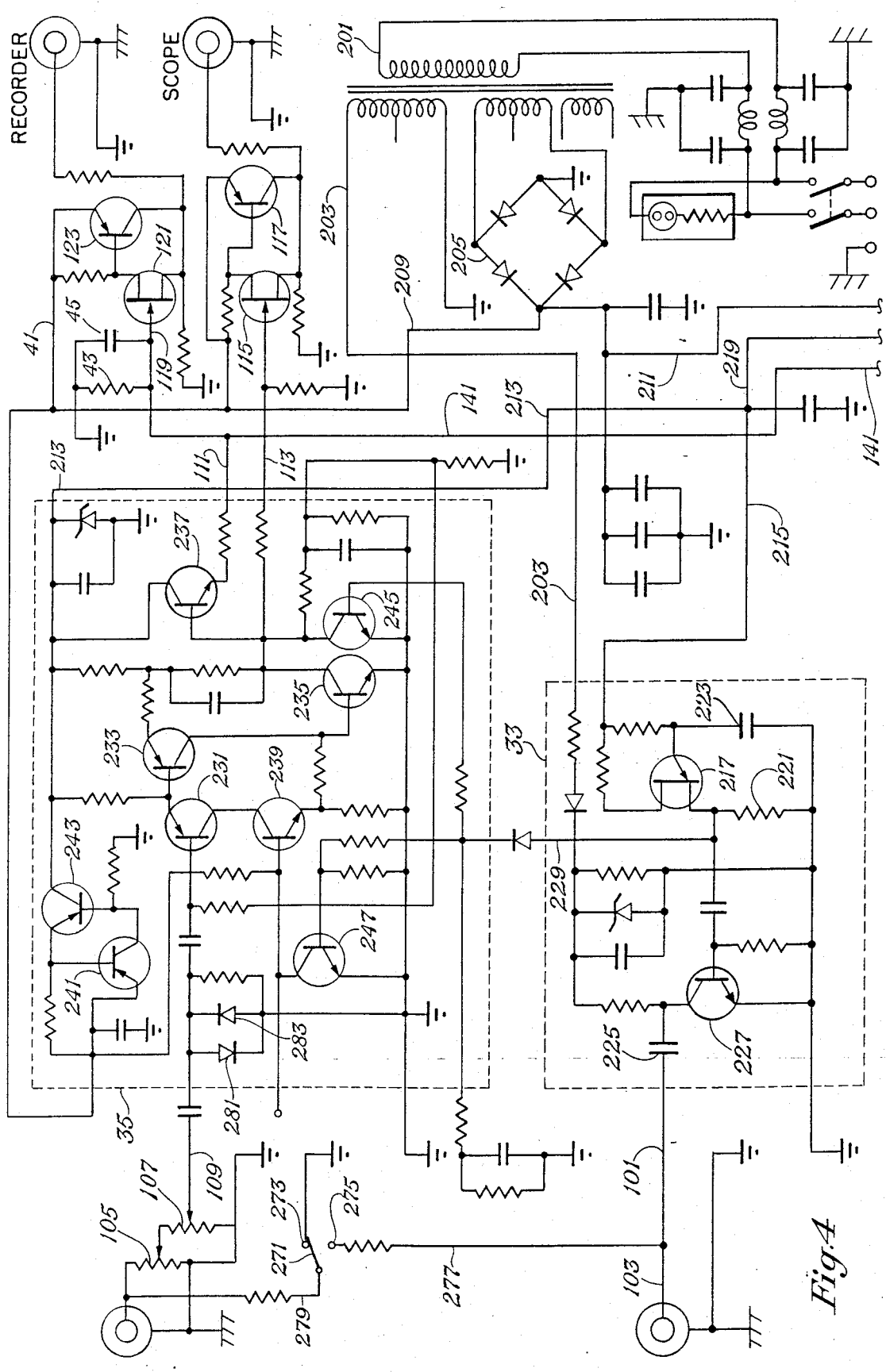
FIGS. 4 and 5 illustrate in detail the circuitry of the present invention.

Referring now to FIG. 1, the testing system of the present invention is shown coupled to a transducer system 11 for testing a bonded structure illustrated at 13. The transducer system illustrated comprises dual transducers 15 and 17 supported in a housing 19 and angled toward one another. Transducer 15 is the transmitter and transducer 17 is the receiver. These transducers are commercially available and may be for example piezo-electric crystals. The transducers 15 and 17 are supported at a selected angle whereby the receiver generally will intercept the maximum reflected energy from inside the structure to be tested. Although not shown, adequate coupling will be provided in the housing 19 to allow transmission of acoustic energy between the faces of the transducers 15 and 17 and the housing face 19A which is adapted to be placed in contact with the structure to be tested. In the testing procedure, the housing 19 will be moved to different places along the surface of the structure and coupling liquid will be sprayed or brushed on the surface of the structure to provide acoustic coupling between the face 19A and the surface of the structure to be tested.

Although not illustrated, it is to be understood that the transducer system 11 may comprise a single transducer which is employed as the transmitter and receiver of acoustic energy for testing purposes. In another embodiment, the transducer system may comprise two separate transducers located in separate housings, one of which is the transmitter and the other of which is a receiver. In this embodiment the separate transducers will be placed on opposite sides of the structure to test for the transmission of acoustic energy from the transmitter to the receiver through the structure.

Structure which may be inspected by the present system may be like or unlike structures bonded together by fusion or nonfusion processes. Nonfusion bonds for example may include adhesive bonds or brazed bonds. As one example structures to be tested may be those employed in the aircraft industry for example thin metal panels bonded together with adhesive. As another example the bonded structure may comprise aluminum skins bonded on opposite sides of a honeycombed structure with adhesive. Other examples may comprise laminated plastics for example those used in the construction of boats or housing.

In the embodiment of FIG. 1, the testing system is identified by reference character 31 and comprises a pulse generator 33 and a receiver amplifier 35 which are adapted to be coupled to the transducers 15 and 17 by way of connectors illustrated at 37 and 39 respectively. The output of the amplifier 35 is applied to a summation circuit 41 comprising a resistor 43, and capacitor 45. The output of the summation circuit is applied to a visual indicator 47 and to low level and high level gates 49 and 51 respectively. The output of these gates are coupled to an alarm system comprising a lamp 53 and an audio alarm 55.

The operation of the system now will be briefly described employing the transducer system incorporating the two angled transducers 15 and 17. Reference will be made first to the bonded structure illustrated in FIG. 2 as the structure to be tested. This structure comprises a thin metal layer or skin 61 bonded to a thin metal layer or skin 63 by way of an adhesive layer 65. The structure of FIG. 2 in one example, may have a thickness between 0.010 to 0.300 of an inch. It is to be understood that thinner or thicker structures may be tested. The thickness of layer 61 may be different from that of layer 63. Inspection can be carried out from either surface 61A or surface 63A. Assume that inspection will be carried out from surface 61A. The housing face 19A is located adjacent and in contact with the surface 61A with adequate liquid coupling located between the face 19A of the housing and the surface 61A of the structure to be tested. In the description of the test to be performed, reference will be made to four interfaces A, B, C, and D. Interface A is that located between housing face 19A and the surface 61A. Interface B is between the layer 61 and the adhesive 65; interface C is between the adhesive 65 and the layer 63; and interface D is between layer 63 and a medium which may be air or liquid.

In operation, the pulse generator 33 is operated to periodically actuate transmitter 15 to produce acoustic pulses which propagate into the structure. Energy reflected back to the surface 61A from the various interfaces is detected by the receiver 17 and applied to the amplifier 35. The output of the amplifier 35 comprises a plurality of electrical pulses of varying height representative of the reflected energy detected following each acoustic pulse. All of these output pulses are summed by the device 41. The output of the device 41 thus comprises a varying DC signal representative of the algebraic sum of the received energy detected by the receiver. This output is applied to the meter 47 and is displayed as a meter movement by the needle 47A. By observing the position of the needle 47A one can determine whether the equipment is being operated properly or whether the structure being tested is properly bonded. The meter 47 also is employed to adjust the gates 49 and 51 to enhance determination of the condition of the bond or satisfactory use of the equipment.

In the use of the system employing the dual transducer system, a mid-scale reading of the meter 47 will indicate a good bond. If this condition exists, the alarm system comprising the lamp 53 and audio alarm 55 will be quiescent or inactive. A low scale reading of the meter 47 will indicate either that the transducer system is tipped or the occurrence of a loss of couplant between the transducer and the part under test or that a condition exists in the part under inspection that is out of the specification set up for evaluation. If these conditions exist, the low gate 49 will be activated to actuate the lamp 53 and/or the audio alarm 55. When the low gate 49 is activated, the lamp 53 will blink and the audio alarm 55 will emit a pulsating sound.

A high scale reading of the meter 47 will indicate that another condition exists in the part under inspection that is out of the specification set up for evaluation. If this condition exists, the high gate 51 will be activated to actuate the lamp 53 and/or the audio alarm 55. When the high gate is activated, the lamp 53 will emit a steady state glow and the audio alarm will emit a continuous audio signal.

In one embodiment, the pulse generator 33 is operated to actuate the transmitter 15 at a repetition rate of about 400 cycles per second. The acoustic pulses produced by the transmitter may have a predominate frequency of about 1 megahertz although it may be higher or lower. In the megahertz range, transmission of acoustic energy through air is at a minimum. Thus if there is a loss of liquid couplant between the transducer and the surface of the part being investigated or if the transducer housing is tipped, then there will be a minimum of energy transmitted into the structure under investigation and hence a minimum of reflected energy detected by the receiver 17. Thus the output of the device 41 will be low which will be indicated by the meter 47 and which will cause the low gate 49 to be activated to actuate the alarm system.

Referring now to FIG. 2, the manner in which the bond condition of the structure under evaluation affects the device 41, the meter 47 and the low and high gates 49 and 51 respectively now will be described with respect to one type of bonded structure. Of interest is to determine whether a good bond exists between metal layers 61 and 63. If the bond is found to be unsatisfactory it is desired to know the position or depth of the flaw, i.e. whether it exists at interface B or interface C in order to facilitate repair for example by injection procedures. The flaw for example may be a void or the inclusion of foreign matter at these interfaces which will cause an unsatisfactory bond.

The propagation of incident and reflected acoustic energy within the structure under evaluation will be described for three conditions which may exist dependent upon the characteristic of the bond. If a good bond exists under the area to be tested, then there will be a minimum of reflection of acoustic energy from the interfaces B and C. A relatively large amount of the energy will be transmitted through these interfaces and through the layers of the structure; reflected from interface D back to the surface 61A; and detected by the receiver 17. The travel path of acoustic energy from surface 61A to interface D and back to surface 61A is illustrated by lines 71 and 73.

Prior to the evaluation, the transducer system is located and operated over an area of the structure known to have a good bond. Generally for a good bond, the output level of the device 41 will fall within a range which is determined by testing operations. This range may exist for example between −5 and +5 as indicated on the meter 47 in FIG. 1. Thus when evaluating a structure, if the needle 47A falls within the predetermined range the operator knows that the bond under the area being investigated is good. Prior to evaluation of a structure, the system will be adjusted or calibrated with respect to a known good bond whereby low gate 49 and high gate 51 will not be activated if the output level of the device 41 lies within the predetermined range. If the output level, however, falls below the minimum value of the range, for example, below −5, then the low gate 49 will be activated to actuate the alarm. On the other hand if the output level rises above the maximum value of the range, for example above +5, the high gate 51 will be activated to actuate the alarm.

Thus when evaluating a bonded structure, if the bond is satisfactory, the needle 47A of the meter 47 will fall within the preselected range and the alarm will not be actuated. The operator thus may observe the meter 47, the lamp 53 or listen for the audio device 55 to determine if a bond is good.

Referring again to FIG. 2, a flaw may be present only at interface C between the adhesive 65 and the skin 63. In this event, the energy from the surface 61A will pass through layers 61 and the adhesive 65 and to the interface C. The travel path of acoustic energy from surface 61A to interface C is illustrated by line 75. Energy from interface C also will be reflected back to the surface 61A. The travel path of reflected energy from interface C to the surface 61A is illustrated by line 77. If a void exists in the adhesive at interface C or foreign matter is present at this point, generally a minimum amount of energy will pass through interface C to the layer 63. The energy reflected back to the surface from interface C generally also will be a minimum since the back surface of the adhesive is not a very good reflector of acoustic energy. In addition due to the flaw, the back surface of the adhesive may not be smooth and a large amount of acoustic energy will be dispersed. Thus the energy reflected back to the surface 61A and detected generally will be a minimum whereby the output of the device means 41 will be a minimum. If the output of the device 41 falls below the preselected lower value of the energy range, the needle 47A will fall below this value and the low gate 49 will be activated to actuate the alarm.

As indicated previously when the alarm is actuated by the low gate 49, lamp 53 will blink and audio device 55 will emit a pulsating sound. Thus in the evaluation procedure, if the alarm is actuated by low gate 49, one knows either that the equipment is not being operated properly or a flaw exists on the back side of the adhesive bond, that is at interface C. By observing the position of the transducer housing and determining whether the couplant is good, one can determine whether the alarm given by the blinking light or pulasting sound is due to improper operation or positioning of the transducer or whether it is due to a flaw at interface C.

If the transducer system is being operated or positioned improperly, corrections can be applied by positioning the transducer system properly or applying more couplant to the top surface 61A.

A third mode of failure may exist however, that is, a flaw may be present at interface B. If this condition exists generally a minimum amount of energy will be transmitted through interface D and layers 65 and 63. The back side of the metal layer 61 will act as a good reflector of acoustic energy. Thus generally a large amount of the energy transmitted into layer 61 will be reflected from interface B back to the surface 61A. The travel path of acoustic energy in this instance from surface 61A, to interface B and back to surface 61A is illustrated by lines 79 and 81. The amount of energy reflected back to the surface and detected will be more than which would occur if the bond had been good completely through the structure. Thus the output of the device 41 will be greater than the maximum preset value of the operating range and the needle 47A will move above the high level of the range and the high gate 51 will be activated to actuate the alarm. As indicated previously, if the high gate 51 actuates the alarm, lamp 51 will burn continuously while audio device 55 will emit a continuous sound. This will notify the operator that a flaw exists on the front side of the adhesive 65.

Thus in testing the structure of FIG. 2, if the equipment is being operated improperly or if a flaw exists at interface C, the needle 47A will be deflected to a low level and the low gate 49 will be activated to periodically actuate the alarm. If the bond is good throughout the structure, however, the meter will reflect a midscale reading and neither of the gates 49 or 51 will be activated whereby the alarm will not be actuated. If however a flaw exists at interface B, the needle 47A will be deflected to a high level, and the high gate 51 will be activated to continuously actuate the alarm.

Referring to FIG. 3, there is disclosed a bonded structure having an additional layer 67 bonded to the layer 63 by way of adhesive layer 69. The present system can be employed to determine whether a flaw exists in the adhesive layers and if so in which layer it exists. In testing a structure of this type, a dual transducer may be employed or a single transducer may be employed which will act both as a transmitter and receiver. Assuming a single transducer is employed, it will be placed adjacent the surface 61A for example and actuated periodically to produce acoustic pulses and then to detect reflected energy following each acoustic pulse. If there is a flaw at adhesive 65, there will be a difference in the amount of reflected energy detected depending upon the position or interface of the flaw as indicated above. This difference or change will be relatively large and the energy detected will be displayed by the meter 47 and will activate either the low gate or high gate. If there is a good bond at adhesive layer 65 but a flaw exists at adhesive layer 69, there also will be a difference in the amount of reflected energy detected depending upon the position or interface of the flaw at layer 69. This difference or change however will be relatively small. The energy detected will be displayed by the meter 47 and will activate either the low gate or the high gate with proper calibration of the system.

In addition to the above modes of operation of the system, other modes of operations may be employed which will be described subsequently.

Figure 5:
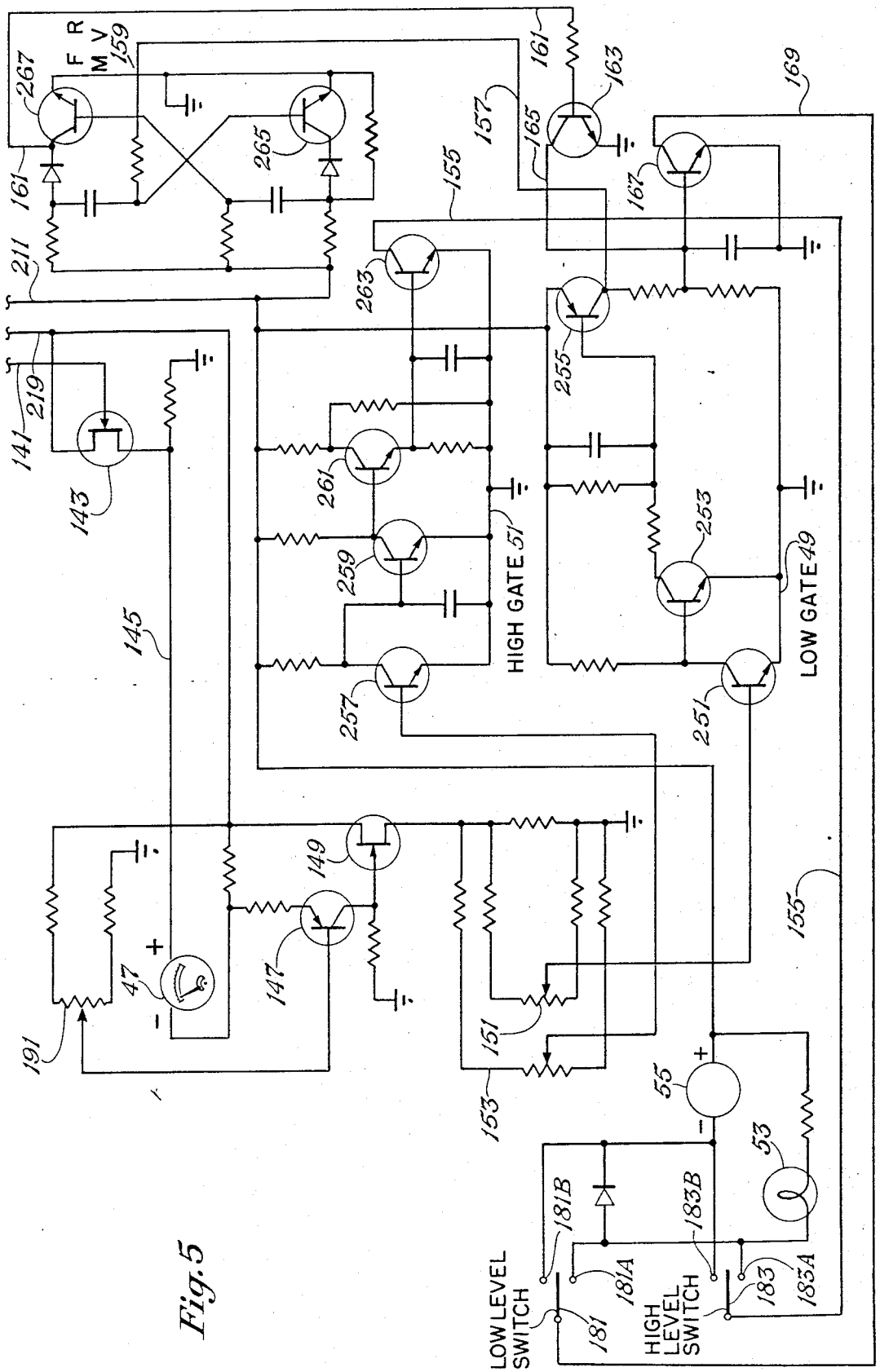

Referring now to FIGS. 4 and 5, a detailed description of the circuitry of the present invention will be described.

In FIGS. 4 and 5, the amplifier is identified at 35, the pulse generator at 33, and the low and high limit gates at 49 and 51. If separate or dual transducers are to be employed as transmitters and receivers respectively, the output of the pulse generator is applied to the transmitter by way of conductors 101 and 103. The input to the amplifier 35 from the receive transducer is by way of potentiometers 105 and 107 and conductor 109. The output of the amplifier is applied both to the device 41 and to an oscilloscope for monitoring purposes. The output of the amplifier 35 is applied to the device 41 by way of conductor 111 and to an oscilloscope by way of conductor 113, field effect transistor 115, and amplifier 117.

As indicated previously, the summation device 41 comprises a resistor 43 and a capacitor 45. In one embodiment, resistor 43 may have a resistance of 6.8 meg ohms while capacitor 45 may have a capacitance of 0.1 microfarads.

The output of the device 41 may be applied to a monitoring device by way of conductor 119, field effect transistor 121, and amplifier 123. The monitoring device in one embodiment may be a strip recorder.

The output of the device 41 also is applied to the meter 47 by way of conductor 141, field effect transistor 143, and conductor 145. Meter 47 in one embodiment is a 0–1 m.a. DC full scale, well dampened meter with a special scale. From the meter 47, the output of the device 41 is applied to the low gate and high gate 49 and 51 by way of transistor 147, field effect transistor 149, and potentiometers 151 and 153 respectively.

The output of the high gate 51 is applied directly to the alarm by way of conductor 155. The output of the low gate 49, however, is applied to the alarm system by way of conductor 157 and a free running multivibrator 159. The output of the free running multivibrator 159 is coupled to the alarm system by way of conductor 161, transistor 163, conductor 165, transistor 167, and conductor 169. The purpose of the free running multivibrator 159 is to cause the alarm to operate periodically when the low gate is activated.

In operation, the output of the high limit gate 51 is off or at a low level when the outut of the device 41 is below the maximum limit of the preselected range. Gate 51 cannot actuate the alarm when it is off or its output is low. Gate 51 turns on or raises its output level sufficient to actuate the alarm when the output of the device 41 rises above the maximum limit of the preselected range.

The output of the low gate 49 is normally off or at a low level when the output of the device 41 is the e minimum limit of the preselected range. When the output of the low gate 49 is off or at a low level, the free running multivibrator 159 is off and the output of amplifier 167 is off or at a low level. Gate 49 cannot actuate or cause the alarm to be actuated when it is off or its output is low. When the output of the device 41 falls below the minimum limit of the preselected range, the low limit gate 49 turns on or raises its output level sufficient to actuate the free running multivibrator 159. When multivibrator 159 begins to oscillate, amplifier 167 periodically turns on to periodically actuate the alarm. In one embodiment, the multivibrator 159 may oscillate at a rate of 25 cycles per second.

The alarm system has two switches 181 and 183 which are selectively adjusted when conducting tests to determine whether the output of the device 41 is within the preselected range or below or above the range. When testing the output of the low level gate, switch 181 is moved to contact either terminal 181A or 181B. If terminal 181A is contacted, only the lamp 53 may be actuated. If terminal 181B is contacted, however, both the lamp 53 and the audio device 55 may be actuated. When testing the output of the high level gate 51, switch 183 is moved to contact either terminal 183A or 183B. If terminal 183A is contacted, the lamp 53 may be actuated. If terminal 183B is contacted, the audio device 55 may be actuated.

Potentiometers 105 and 107 and potentiometers 151 and 153 are employed in calibrating or adjusting the system including the meter 47 and to set the low and high gates whereby they will respond to the minimum and maximum limits of the preselected or predetermined range. The preselected range is determined by conducting tests with the transducer system located over a good standard bond while observing the meter. Potentiometers 105 and 107 may be adjusted to center the range, as reflected by the needle movement, about the center point on the meter. Potentiometer 191 is employed to adjust the scale of the meter.

Having determined the range and adjusted the meter to reflect the range, low and high gates 49 and 51 then are adjusted or calibrated to respond to the minimum and maximum limits respectively of the preselected or predetermined range. These adjustments are carried out while still conducting tests over a good and standard bond and by adjusting potentiometers 105 and 107 and potentiometers 151 and 153. Assume that is is desirable to adjust the low gate 49 to respond or to turn on if the needle 47A of the meter 47 falls below −5 and in the negative direction. Either one or both of potentiometers 105 and 107 are adjusted to position the needle at the −5 point on the meter scale. With the low level switch 181 properly set, potentiometer 151 then is adjusted to find the transition point where the alarm will either be actuated or turn off if the potentiometer 151 is adjusted in either direction.

In a similar manner, the high gate 51 may be adjusted to respond or turn on if the needle 47A rises above +5 in the positive direction. In this respect either one or both of potentiometers 105 and 107 are adjusted to position the needle at the +5 position on the scale of the meter. With the high level switch 183 properly set, potentiometer 153 then is adjusted to find the transition point where the alarm will either be actuated or turn off if the potentiometer 153 is adjusted in either direction.

Having set both the low and high gates to respond to the minimum and maximum limits of the preselected range, potentiometers 105 and 107 are readjusted to center the range on the scale and initially to locate the needle 47A at the center point on the meter scale.

Other details of the circuitry now will be described. The power supply comprises a transformer 201 which applies 200 volts to the pulse generator 33 by way of conductor 203. Also provided is a rectifier bridge 205 which produces 18 volts DC at its output and which is applied to the amplifier 35 by way of conductor 209 and to the low and high gates 49 and 51 and the multivibrator 159 by way of conductor 211. 12 volts DC is taken from the amplifier 35 and applied by way of conductor 213 and conductor 215 to a unijunction oscillator 217 which forms part of the pulse generator. In addition from conductor 213, 12 volts is applied by way of conductor 219 to operate other components.

The unijunction oscillator 217 oscillates at a repetition rate determined by the values of resistor 221 and capacitor 223. The output from power conductor 203 is applied to charge a capacitor 225. When the unijunction oscillator 217 produces an output pulse, transistor 227 momentarily conducts whereby the capacitor 225 discharges to ground. This produces the sharp pulse which is applied by way of conductor 101 to trigger the transmitter. From the unijunction oscillator 217, a blanking pulse is applied by way of conductor 229 to blank out the amplifier 35 during the time that the transducer is actuated to produce an acoustic pulse.

The amplifier 35 comprises transistors 231, 233, 235, and 237 for amplifying the received signal. Also included are transistors 239, 241, 243, and transistors 245 and 247, the latter two which act as feedback controls for maintaining linearity. The blanking pulse from conductor 229 is applied to the base of transistors 245 and 247 to blank out these amplifiers during the time that the transmitter is pulsed. In one embodiment amplifier 35 was formed from an integrated circuitry identified as ICI CA3046 with certain external components and transistors incorporated to form the amplifier 35 as illustrated in FIG. 4.

Low and high gates 49 and 51 and multivibrator 159 were also formed from a similar integrated circuit but connected in the manner illustrated with certain additional external components to form these gates and multivibrator as illustrated. Low gate 49 comprises transistors 251, 253, and 255 while high gate 51 comprises transistors 257, 259, 261, and 263. The multivibrator 159 comprises transistors 265 and 267.

In the operations where separate or dual transducers are to be employed to carry out the evaluation tests, switch 271 is moved to contact terminal 273 as illustrated in FIG. 4 whereby the output of the capacitor 225 is applied to the transmitter by way of conductors 101 and 103. In the event that a single transducer is to be employed both as a transmitter and receiver, switch 271 is moved to contact terminal 275 whereby the output of the capacitor 225 will be applied to the single transducer by way of conductor 101, conductor 277, switch 271, and conductor 279.

As illustrated in FIG. 4, back to back diodes 281 and 283 are coupled to the input conductor 109. These diodes short to ground an input above a low level for example above one-half of a volt. Thus when a single transducer is being employed both as a transmitter and receiver, the amplifier 35 will not be driven to saturation due to high voltage levels on conductor 109. The output of the transducer and representative of reflected energy detected by the transducer, is relatively low for example in the neighborhood of 10 to 20 millivolts. Thus these lower voltage pulses are much lower than the one half volt threshold of the back to back diodes and hence will be applied directly to the amplifier and not be affected by the diodes. As indicated previously blanking pulses are also applied to the amplifier 35 to blank out the amplifier during transmission whereby high level signals produced during pulsing of the transmitter particularly when a single transducer is being used, will not be amplified by the amplifier 35 and applied to the circuitry.

Now that several modes of operation have been disclosed and the system has been described in detail, three modes of operations will be described to evaluate an aluminum skin bonded to a honeycomb and another aluminum skin bonded to the opposite side. Initially, two separate transducers, one to transmit and the other to receive, may be coupled to the connectors 37 and 39 respectively (see FIG. 1). Switch 271 is moved to contact the terminal 273. One transducer may be placed on a front surface and the other directly opposite on the back surface of the bonded structure, utilizing ample couplant under each transducer. The potentiometer controls then may be adjusted until maximum needle reading is obtained on the meter 47 and the lamp 53, when employing the high limit gate 51, shows a steady glow of light over a known good area and is off when one of the transducers is moved out of line with the other. If a total inspection is to be made, one surface should be gridded in transducer size blocks and the receiver transducer placed in each square, with proper couplant, at the same time that the transmitter transducer is moved in a circular motion on the back skin utilizing ample couplant. Each square will cause the alarm to sound and the light to glow if a good bond is present. When the transducers are opposite one another, the void or no signal areas can be marked.

The dual angled transducer system may then be employed to evaluate the bond lines under each surface to determine if the void is on the front or back of the part, and to determine in some cases if the skin has separated from the adhesive or the adhesive from the core. This is accomplished by connecting the dual transducer connections to the connectors 37 and 39 with the switch 271 in contact with terminal 273. Utilizing ample couplant, the transducer system is placed on several good spots on the part while determining the preselected range and adjusting the potentiometers 105 and 107 to place the meter needle at the center scale reading of the meter. The low and high gates then may be set to respond to the minimum and maximum limits of the preselected range as described previously. The transducers may be than placed over the no signal areas and a sharp change will be noted in the meter reading if the void is on the side nearest the transducer and is at the bond line only.

If the high limit gate alarms and the lamp glow is steady and the needle of the meter moves to the high side, the void will be a slick bond or delamination between the skin and adhesive, an inclusion next to the skin, or core crushed against the skin. If the low limit gate alarms and the needle of the meter is deflected down scale, the defect indication may be due to a lack of couplant, a delamination between the adhesive and core, an inclusion between the adhesive and core, or a short core and very long fillets.

Similar tests can be carried out from the other side of the structure. If no drastic needle movement or alarm is given from either side of the structure over the void areas, then a single transducer may be connected to the transmitter connection 37 and the switch 271 located to contact terminal 275. The single transducer may then be placed over a good area of the part with ample couplant and the potentiometers 105 and 107 adjusted until a mid-scale meter reading is maintained over several locations. The gates then may be adjusted until neither will alarm if the needle of the meter is located within the preselected range. The transducer may then be placed over the void areas for further testing.

It is to be understood that voids or defects existing in a bonded structure may be different from those previously explained, but in either case the upper or lower gates will be actuated to set off the alarm when using either a single or dual transducer, and will show that the bonded structure is not up to specifications.

I claim:

1. Apparatus for use with a sonic transducer means for inspecting the characteristics of bonds formed between layers of material comprising:

pulsing means for periodically generating trigger pulses for application to a transducer means for actuating the transducer means to periodically generate successive acoustic pulses spaced in time for inspection purposes, amplifier means for amplifying the wave train of acoustic energy pulses detected by the transducer means following each acoustic pulse generated, and summation means coupled to the output of said amplifier means for producing an output representative of the algebraic sum of the wave train of acoustic energy pulses detected by the transducer means over a plurality of successive pulse periods and amplified by said amplifier means, wherein the pulse period is defined as the time between corresponding points on successive trigger pulses generated.

2. The apparatus of claim 1 comprising display means coupled to said summation means for visually displaying the output of said summation means.

3. The apparatus of claim 1 comprising indicating means coupled to the output of said summation means for producing an output indication if the output of said summation means is below or above a preselected range.

4. The apparatus of claim 3 wherein said indicating means comprises circuitry for producing first and second signals if the output of said summation means is below or above predetermined low and high values respectively.

5. The apparatus of claim 4 comprising an alarm system adapted to be coupled to said circuitry for producing an alarm in response to said first and second signals.

6. The apparatus of claim 2, comprising:
circuitry for producing first and second signals if the output of said summation means is below or above predetermined low and high values respectively, and
an alarm system adapted to be coupled to said circuitry for producing an alarm in response to said first and second signals.

7. The apparatus of claim 1, comprising:
first means coupled to the output of said summation means for producing a signal when the output of said summation means is below a first predetermined value, and
second means coupled to the output of said summation means for producing a signal when the output of said summation means is above a second predetermined value greater than said first predetermined value.

8. The apparatus of claim 1, comprising:
means coupled to said summation means for visually displaying the output of said summation means,
first means coupled to the output of said summation means for producing a signal when the output of said summation means is below a first predetermined value, and
second means coupled to the output of said summation means for producing a signal when the output of said summation means is above a second predetermined value greater than said first predetermined value.

9. The apparatus of claim 8 comprising an alarm system adapted to be coupled to the output of said first and second means for producing an alarm indication if the output of said summation means falls below said first predetermined value or rises above said second predetermined value.

10. The apparatus of claim 9 wherein said first and second means are coupled to said summation means by way of said means for visually displaying the output of said summation means.

11. The apparatus of claim 1, wherein:
said summation means comprises R-C circuitry having a time constant substantially greater than the pulse period.

12. The apparatus of claim 11, wherein:
said R-C circuitry has a time constant which is greater than a plurality of successive pulse periods.

13. The apparatus of claim 11 wherein the ratio between the time constant of said R-C circuitry and the pulse period is at least 50/1.

14. Apparatus for use with a sonic transducer means for inspecting the characteristics of bonds formed between layers of materials comprising:
pulsing means for periodically generating trigger pulses for application to a transducer means for actuating the transducer means to periodically generate successive acoustic pulses spaced in time for inspection purposes,
amplifier means for amplifying the wave train of acoustic energy pulses detected by the transducer means following each acoustic pulse generated,
R-C circuitry comprising resistive and capacitive means coupled to the output of said amplifier means, and
indicating means coupled to the output of said R-C circuitry,
said R-C circuitry having a time constant which is greater than a plurality of successive pulse periods and which time constant is sufficient to produce a varying DC output representative of the algebraic sum of the wave train of acoustic energy pulses detected by the transducer means over a plurality of successive pulse periods and amplified by said amplifier means,
wherein the pulse period is defined as the time between corresponding points on successive trigger pulses generated,
said output being a function of the amplitude, width, and number of acoustic energy pulses detected within each pulse period over said plurality of successive pulse periods.

15. A system for inspecting the characteristics of bonds formed between layers of material, comprising:

transducer means for generating acoustic pulses for propagation into the material and for receiving acoustic energy from the material and resulting from the generation of the acoustic pulses,
pulsing means coupled to said transducer means for periodically generating trigger pulses for application to the transducer means for actuating the transducer means to periodically generate acoustic pulses spaced in time for inspection purposes,
amplifier means coupled to said transducer means for amplifying the wave train of acoustic energy pulses received by the transducer means following each acoustic pulse generated,
R-C circuitry comprising resistive and capacitive means coupled to the output of said amplifier means, and
measuring means coupled to the output of said R-C circuitry,
said R-C circuitry having a time constant which is greater than a plurality of successive pulse periods and which time constant is sufficient to produce a varying DC output representative of the algebraic sum of the wave train of acoustic energy pulses detected by said transducer means over a plurality of successive pulse periods and amplified by said amplifier means, wherein the pulse period is defined as the time between corresponding points on successive trigger pulses generated, said output being a function of the amplitude, width, and number of acoustic energy pulses detected within each pulse period over said plurality of successive pulse periods.

16. The system of claim 15, wherein:
the ratio between the time constant of said R-C circuitry and the pulse period is at least 50/1.

17. The system of claim 15, wherein: said ratio is equal to about 272/1.

18. The system of claim 16, wherein:
said transducer means comprises separate transducers for transmitting and receiving acoustic energy respectively.

19. The system of claim 16, wherein:
said transducer means comprises a single transducer for transmitting and receiving acoustic energy.

20. The system of claim 14 wherein said indicating means comprises:
a visual indicating meter coupled to the output of said R-C circuitry for visually reflecting the output produced by said R-C circuitry,
said meter being a DC, well dampened meter,
first gate means coupled to said output of said R-C circuitry by way of said visual indicating meter,
second gate means coupled to the output of said R-C circuitry by way of said visual indicating meter,
warning means,
adjusting means coupled to the input of said amplifier means for adjusting the level of the output from said R-C circuitry applied to said meter and to said first and second gate means,
adjusting means coupled between said meter and said first gate means for adjusting said first gate means to respond to a lower limit for actuating said warning means if the output of said R-C circuitry is below said lower limit, and
adjusting means coupled between said meter and said second gate means for adjusting said second gate means to respond to an upper limit at a predetermined range above said lower limit for actuating said warning means if the output of said R-C circuitry is above said upper limit.

21. A, method of inspecting the characteristics of bonds formed between layers of material, comprising the steps of:
periodically generating trigger pulses for application to a transducer means to periodically generate acoustic pulses spaced in time for application to the material to be investigated,
detecting the wave train of acoustic energy pulses emanating from said material following each acoustic pulse generated,
producing a varying DC output representative of the algebraic sum of the wave train of acoustic energy pulses detected over a plurality of successive pulse periods, wherein the pulse period is defined as the time between corresponding points on successive trigger pulses generated,
said output being a function of the amplitude, width, and number of acoustic energy pulses detected within each pulse period over said plurality of successive pulse periods, and
applying said output to an indicating means to provide an indication representative of the energy detected over a plurality of said successive pulse periods as a result of the acoustic pulses generated and applied to said material.

* * * * *